(12) United States Patent
Han et al.

(10) Patent No.: US 10,116,004 B2
(45) Date of Patent: Oct. 30, 2018

(54) ELECTROLYTE FOR LITHIUM BATTERY FOR SOLID STATE DRIVE BACKUP POWER AND LITHIUM BATTERY FOR SOLID STATE DRIVE BACKUP POWER INCLUDING THE SAME

(71) Applicant: SAMSUNG SDI CO., LTD., Yongin-si, Gyeonggi-do (KR)

(72) Inventors: Da-Woon Han, Yongin-si (KR); Kyeu-Yoon Sheem, Yongin-si (KR); Jan-Dee Kim, Yongin-si (KR); Sung-Hwa Eo, Yongin-si (KR)

(73) Assignee: Samsung SDI Co., Ltd., Yongin-Si, Gyeonggi-do (KR)

( * ) Notice: Subject to any disclaimer, the term of this patent is extended or adjusted under 35 U.S.C. 154(b) by 521 days.

(21) Appl. No.: 14/594,781

(22) Filed: Jan. 12, 2015

(65) Prior Publication Data
US 2015/0229005 A1    Aug. 13, 2015

(30) Foreign Application Priority Data

Feb. 7, 2014 (KR) ........................ 10-2014-0014446

(51) Int. Cl.
*H01M 10/0568* (2010.01)
*H01M 10/0569* (2010.01)
*H01M 10/0567* (2010.01)
*H01M 10/0525* (2010.01)

(52) U.S. Cl.
CPC ... *H01M 10/0569* (2013.01); *H01M 10/0567* (2013.01); *H01M 10/0568* (2013.01); *H01M 10/0525* (2013.01); *H01M 2220/10* (2013.01); *H01M 2220/30* (2013.01); *H01M 2300/0028* (2013.01); *H01M 2300/0037* (2013.01); *Y02E 60/122* (2013.01)

(58) Field of Classification Search
CPC ......... H01M 10/0568; H01M 10/0569; H01M 10/0567; H01M 10/0525; H01M 2300/0028; H01M 2300/0037; H01M 2220/10; H01M 2220/30; Y02E 60/122
See application file for complete search history.

(56) References Cited

U.S. PATENT DOCUMENTS

| | | | |
|---|---|---|---|
| 7,172,834 B1* | 2/2007 | Jow | H01M 10/0569 429/329 |
| 2003/0148183 A1* | 8/2003 | Yamasaki | H01M 10/0569 429/231.1 |
| 2003/0162097 A1* | 8/2003 | Fujino | H01M 10/0565 429/326 |
| 2010/0068612 A1* | 3/2010 | Nishikawa | H01M 2/145 429/129 |

FOREIGN PATENT DOCUMENTS

| | | |
|---|---|---|
| CN | 1956253 A | 5/2007 |
| CN | 102332606 A | 1/2012 |
| KR | 2005-0029984 A | 3/2005 |

OTHER PUBLICATIONS

S.S. Zhang et al, "A new approach toward improved low temperature performance of Li-ion battery", Electrochemistry Communications, 2002, p. 928-932, vol. 4, Elsevier.

* cited by examiner

*Primary Examiner* — Laura Weiner
(74) *Attorney, Agent, or Firm* — Lee & Morse, P.C.

(57) ABSTRACT

An electrolyte for a lithium battery for solid state drive backup power and a lithium battery for solid state drive backup power including the same, the electrolyte including a non-aqueous organic solvent; and a lithium salt, wherein the lithium salt includes $LiBF_4$ and the electrolyte has a molar concentration of the $LiBF_4$ of about 0.8 M to about 1.2 M.

11 Claims, 3 Drawing Sheets

ELECTROLYTE FOR LITHIUM BATTERY FOR SOLID STATE DRIVE BACKUP POWER AND LITHIUM BATTERY FOR SOLID STATE DRIVE BACKUP POWER INCLUDING THE SAME

CROSS-REFERENCE TO RELATED APPLICATION

Korean Patent Application No. 10-2014-0014446, filed on Feb. 7, 2014, in the Korean Intellectual Property Office, and entitled: "Electrolyte For Lithium Battery For Solid State Drive Backup Power And Lithium Battery For Solid State Drive Backup Power INCLUDING The Same," is incorporated by reference herein in its entirety.

BACKGROUND

1. Field

Embodiments relate to an electrolyte for a lithium battery for solid state drive backup power and a lithium battery for solid state drive backup power including the same.

2. Description of the Related Art

A solid state drive (SSD) may be more resistant to shock than a hard disk drive (HDD), may not have great output consumption, may use capacity more effectively, and may have a long lifespan, fast access time, and an excellent read performance.

The SSD may include a controller, a memory that stores data, and a cache memory. The memory may include a NAND flash memory and/or a DRAM memory.

The NAND flash memory may have non-volatile characteristics, may use a small amount of power, and may have a slow writing speed. The DRAM memory may have fast reading and writing speeds, and may have volatile characteristics.

SUMMARY

Embodiments are directed to an electrolyte for a lithium battery for solid state drive backup power and a lithium battery for solid state drive backup power including the same.

The embodiments may be realized by providing an electrolyte for a lithium battery for solid state drive backup power, the electrolyte including a non-aqueous organic solvent; and a lithium salt, wherein the lithium salt includes $LiBF_4$ and the electrolyte has a molar concentration of the $LiBF_4$ of about 0.8 M to about 1.2 M.

The non-aqueous organic solvent may include propylene carbonate.

The propylene carbonate may be included in the non-aqueous organic solvent in an amount of about 20 parts by weight or greater, based on 100 parts by weight of the non-aqueous organic solvent.

The propylene carbonate may be included in the non-aqueous organic solvent in an amount of 20 parts by weight to about 50 parts by weight, based on 100 parts by weight of the non-aqueous organic solvent.

The non-aqueous organic solvent may further include at least one of ethylene carbonate, diethylene carbonate, fluoroethylene carbonate, butylene carbonate, dimethyl carbonate, diethyl carbonate, methylethyl carbonate, methylpropyl carbonate, ethylpropyl carbonate, methyl isopropyl carbonate, dipropyl carbonate, dibutyl carbonate, benzonitrile, acetonitrile, tetrahydrofuran, 2-methyl tetrahydrofuran, γ-butyrolactone, dioxolane, 4-methyl dioxolane, N, N-dimethylformamide, dimethylacetamide, dimethylsulfoxide, dioxane, 1,2-dimethoxyethane, sulfolane, dichloroethane, chlorobenzene, nitrobenzene, diethylene glycol, or dimethyl ether.

The non-aqueous organic solvent may include at least one of ethylene carbonate and diethylene carbonate.

The ethylene carbonate may be included in the non-aqueous organic solvent in an amount of about 40 parts by weight to about 90 parts by weight, based on 100 parts by weight of the non-aqueous organic solvent.

The diethylene carbonate may be included in the non-aqueous organic solvent in an amount of about 1 part by mass to about 20 parts by weight, based on 100 parts by weight of the non-aqueous organic solvent.

The electrolyte may further include an additive including at least one of 1,3-propane sultone, succinic anhydride, ethenyl sulfonyl benzene, fluorobenzene, chlorobenzene, bromobenzene, iodobenzene, biphenyl, cyclohexyl benzene, or vinylene carbonate.

The additive may be included in the electrolyte in an amount of about 0.1 wt % to about 20 wt %, based on a total weight of the electrolyte.

The embodiments may be realized by providing a lithium battery for solid state drive backup power, the lithium battery including a positive electrode including a positive active material capable of intercalation and deintercalation of lithium ions; a negative electrode including a negative active material capable of intercalation and deintercalation of lithium ions; and the electrolyte according to an embodiment.

The negative active material may include soft carbon.

The lithium battery for solid state drive backup power may be a lithium ion battery.

A driving temperature range of the lithium battery for solid state drive backup power may be about −10° C. to about 85° C.

The lithium battery may further include a separator between the positive electrode and the negative electrode.

One of the positive electrode or the negative electrode may include a current collector, the current collector including aluminum.

The non-aqueous organic solvent may include propylene carbonate.

The propylene carbonate may be included in the non-aqueous organic solvent in an amount of about 20 parts by weight or greater, based on 100 parts by weight of the non-aqueous organic solvent.

BRIEF DESCRIPTION OF THE DRAWINGS

Features will be apparent to those of skill in the art by describing in detail exemplary embodiments with reference to the attached drawings in which.

DETAILED DESCRIPTION

Figure 1:
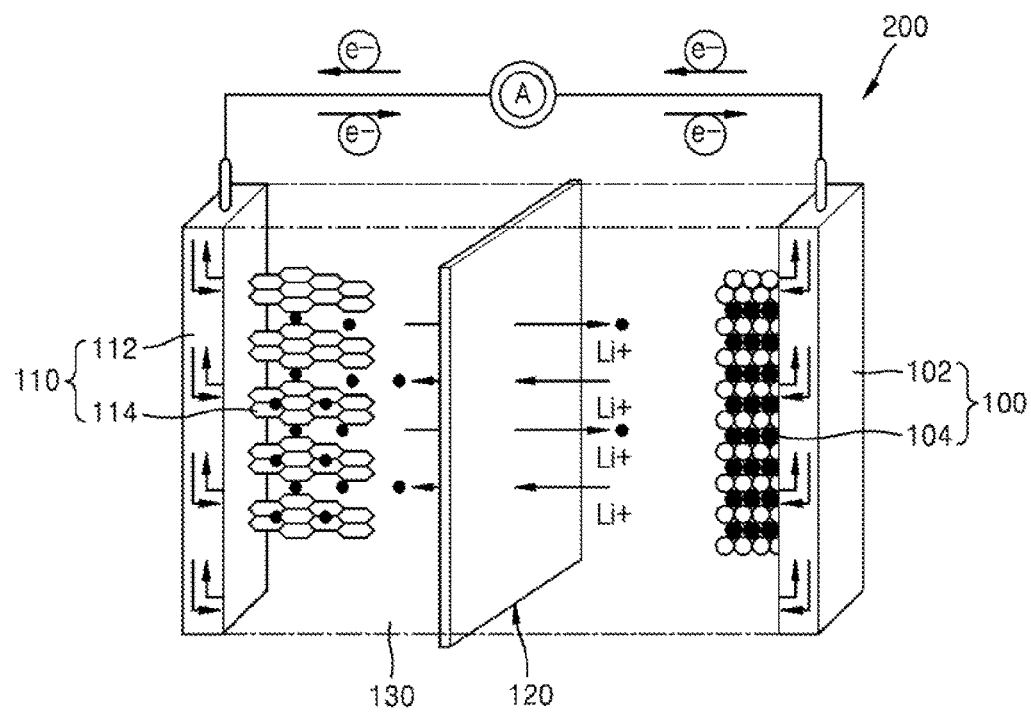
FIG. 1 illustrates a schematic view of a lithium battery according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. Like reference numerals refer to like elements throughout.

Expressions such as "at least one of," when preceding a list of elements, modify the entire list of elements and do not modify the individual elements of the list.

Hereinafter, an electrolyte for a lithium battery for solid state drive backup power and a lithium battery for solid state drive backup power including the same according to an embodiment will be described in greater detail.

An embodiment may include an electrolyte for a lithium battery for solid state drive backup power including a non-aqueous organic solvent and a lithium salt. The lithium salt may include $LiBF_4$. A molar concentration of the $LiBF_4$ in the electrolyte may be about 0.8 M to about 1.2 M.

The lithium battery may include a current collector of a positive electrode, which may include aluminum. An aluminum current collector may naturally form an oxide-based surface layer, and may resist a high voltage in the positive electrode during driving of the lithium battery. However, the aluminum current collector may be limited with respect to selection of a lithium salt of the electrolyte in view of stability. Examples of the suitable lithium salt may include salts that passivate and protect aluminum of the aluminum current collector, which may include, e.g., $LiPF_6$.

$LiPF_6$ may have advantages of forming a stable solid electrolyte interface on a graphite negative electrode surface, providing high ion conductivity in a non-aqueous organic solvent at room temperature, and flame retardancy. However, $LiPF_6$ may be sensitive to thermal stability and moisture.

For example, $LiPF_6$ may thermally decompose in the electrolyte at a temperature of about 85° C. or greater to produce $PF_5$ and $LiF$. $PF_5$, which is one of the decomposed products obtained, may react with a solvent in the electrolyte, may form a gaseous product, and may further progress the thermal decomposition of $LiPF_6$. Also, when there is moisture, $LiPF_6$ may be easily hydrolyzed into $POF_3$ and HF, which may show toxicity and/or may play an important role in or promote the elution of a positive active material, e.g., a positive active material of spinel-based lithium manganese oxide. Accordingly, it may be difficult to use a lithium battery including $LiPF_6$ as a lithium salt in the electrolyte as a lithium battery for solid state drive backup power, because the lithium battery including $LiPF_6$ as a lithium salt may only be driven under low moisture environment in a temperature range close to room temperature, and the lithium battery for solid state drive backup power may have a driving temperature range of about −10° C. to about 85° C.

As noted above, the electrolyte for a lithium battery for solid state drive backup power according to an embodiment may include a non-aqueous organic solvent and a lithium salt. The lithium salt may include $LiBF_4$, and a molar concentration of the $LiBF_4$ in the electrolyte may be about 0.8 M to about 1.2 M. Such an electrolyte may help reduce or inhibit a side reaction with a positive electrode at a high temperature, such that the lithium battery including the electrolyte may have thermal stability even at a high temperature. For example, the lithium battery may be driven at a high temperature and the lithium battery may be stably charged and discharged when driven at a high temperature.

If a mixture salt of $LiPF_6$ and $LiBF_4$ were to be used as the lithium salt in the electrolyte, and if the driving temperature of the lithium battery were to be greater than about 60° C., the $LiPF_6$ may be thermally decomposed and the lithium battery (including the mixed-salt electrolyte) may undesirably swell.

The non-aqueous organic solvent may include propylene carbonate. The propylene carbonate may be included in the non-aqueous organic solvent in an amount of about 20 parts by weight or greater, based on 100 parts by weight of the non-aqueous organic solvent. For example, the propylene carbonate may be included in an amount of about 20 parts by weight to about 50 parts by weight, based on 100 parts by weight of the non-aqueous organic solvent.

Maintaining the amount of propylene carbonate within the above ranges may help ensure that the lithium battery is thermally stable at high temperature without swelling phenomenon and is stably charged and discharged during driving.

The non-aqueous organic solvent may further include, e.g., in addition to the propylene carbonate, at least one non-aqueous organic solvent selected from ethylene carbonate, diethylene carbonate, fluoroethylene carbonate, butylene carbonate, dimethyl carbonate, diethyl carbonate, methylethyl carbonate, methylpropyl carbonate, ethylpropyl carbonate, methyl isopropyl carbonate, dipropyl carbonate, dibutyl carbonate, benzonitrile, acetonitrile, tetrahydrofuran, 2-methyl tetrahydrofuran, γ-butyrolactone, dioxolane, 4-methyl dioxolane, N, N-dimethylformamide, dimethylacetamide, dimethylsulfoxide, dioxane, 1,2-dimethoxyethane, sulfolane, dichloroethane, chlorobenzene, nitrobenzene, diethylene glycol, or dimethyl ether. For example, the non-aqueous organic solvent may include at least one of ethylene carbonate and diethylene carbonate.

The non-aqueous organic solvent may facilitate dissociation of $LiBF_4$ to help improve a degree of ion dissociation and ion conductivity.

The ethylene carbonate may be included in the non-aqueous organic solvent in an amount of, e.g., about 40 parts by weight to about 90 parts by weight, about 40 parts by weight to about 80 parts by weight, or about 45 parts by weight to about 80 parts by weight, based on 100 parts by weight of the non-aqueous organic solvent.

The diethylene carbonate may be included in the non-aqueous organic solvent in an amount of, e.g., about 1 part by mass to about 20 parts by weight, about 1 part by mass to about 15 parts by weight, or about 1 part by mass to about 10 parts by weight, based on 100 parts by weight of the non-aqueous organic solvent.

Maintaining the amounts of ethylene carbonate and diethylene carbonate within the ranges described above may help ensure that the ethylene carbonate and the diethylene carbonate facilitate dissociation of $LiBF_4$ to further improve the degree of ion dissociation and ion conductivity.

The electrolyte may further include an additive, e.g., 1,3-propane sultone, succinic anhydride, ethenyl sulfonyl benzene, fluorobenzene, chlorobenzene, bromobenzene, iodobenzene, biphenyl, cyclohexyl benzene, or vinylene carbonate.

The additive may be included in the electrolyte in an amount of about 0.1 wt % to about 20 wt %, based on a total weight of the electrolyte.

The additive may help inhibit decomposition of the non-aqueous organic solvent in the electrolyte. As a result, the additive may help reduce or sometimes stop the generation of gas caused by the decomposition of the non-aqueous organic solvent. As a result, danger of explosion due to the accumulation of gas may be reduced and/or eliminated and thus, stability of the electrolyte at high temperature may be improved. Including the additive in the amounts described above may help increase stability of the electrolyte at high temperature and may help minimize effects of a side reaction caused by the use of the additive, such that the electrolyte may have suitable conductivity and viscosity.

A lithium battery for solid state drive backup power according to an embodiment may include a positive electrode (including a positive active material that is capable of intercalation and deintercalation of lithium ions); a negative electrode (including a negative active material that is capable of intercalation and deintercalation of lithium ions); and an electrolyte (e.g., between the positive electrode and the negative electrode), wherein the electrolyte may be the electrolyte according to an embodiment described above.

FIG. 1 illustrates a schematic view of a lithium battery 200 according to an embodiment. Referring to FIG. 1, the lithium battery 200 may include the positive electrode 100, the negative electrode 110, the electrolyte 130 between the positive electrode 100 and the negative electrode 110, and a separator 120 between the positive electrode 100 and the negative electrode 110.

The negative electrode 110 may include a current collector 112 and a negative active material layer 114 on the current collector 112.

The current collector 112 may be or may include stainless steel, nickel, aluminum, iron, copper, titanium, a polymer substrate coated with conductive metal, or a combination thereof For example, copper may be used as the current collector 112. The current collector 112 may have, e.g., a thin film shape, a plate shape, a mesh (grid) shape, a foam (sponge) shape, or the like.

The negative active material for forming the negative active material layer 114 may be or may include a lithium metal, a metallic material alloyable with lithium, a transition metal oxide, a material capable of doping and de-doping lithium, or a material that may reversibly intercalate and deintercalate lithium ions.

Examples of the transition metal oxide may include vanadium oxide and lithium vanadium oxide; examples of the material that is capable of doping and de-doping lithium may include Si, $SiO_x$ (0<x<2), a Si—Y alloy (wherein, Y is an alkali metal, an alkaline earth metal, an element from Groups 13 to 16, a transition metal, a rare earth element, or a combination element thereof, but is not Si), Sn, $SnO_2$, and Sn—Y (wherein, Y is an alkali metal, an alkaline earth metal, an element from Groups 13 to 16, a transition metal, a rare earth element, or a combination element thereof, but not Sn), or at least one of these and $SiO_2$ may be mixed. The element Y may be Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, or a combination thereof.

The material that may reversibly intercalate and deintercalate lithium ions may be a carbonaceous material, which may be a suitable carbonaceous negative active material used in a lithium ion secondary battery. Examples thereof may include crystalline carbon, amorphous carbon, or a combination thereof The crystalline carbon may include natural graphite or synthetic graphite having an amorphous form, a flat form, a flake form, a spherical form, or a fiber form, and the amorphous carbon may include soft carbon (low temperature calcined carbon), hard carbon, mesophase pitch carbide, and calcined coke.

The negative active material may include a material that may intercalate and deintercalate lithium ions. For example, the negative active material may be or may include soft carbon.

In an implementation, the negative active material may include a suitable material that is capable of intercalation and deintercalation of lithium ions.

The negative electrode 112 may be prepared by mixing the negative active material, a conductor, a binder, and a solvent to prepare a negative active material composition, which may be directly coated on a copper foil current collector to manufacture a negative electrode plate. In an implementation, the negative active material composition may be cast on a separate support, and a negative active material film peeled off from the support may be laminated on the copper current collector to manufacture a negative electrode plate.

The conductor may include, e.g., carbon black, graphite granules, natural graphite, synthetic graphite, acetylene black, Ketjen black, carbon fiber; carbon nanotubes; a metal powder, a metal fiber, or a metal tube of copper, nickel, aluminum, or silver; or a conductive polymer such as polyphenylene derivative.

The binder may include, e.g., vinylidene fluoride/hexafluoropropylene copolymer, polyvinylidene fluoride (PVDF), polyacrylonitrile, polymethyl methacrylate, polytetrafluoroethylene (PTFE), a mixture of the polymers described above, a styrene butadiene rubber-based polymer, or the like.

The solvent may include a suitable solvent. In an implementation, the solvent may include, e.g., N-methyl pyrrolidone (NMP), acetone, water, or the like. Amounts of the negative active material, the conductor, the binder, and the solvent may be amounts suitably used in a lithium battery. For example, a weight ratio of the negative active material to a mixture weight of the conductor and the binder may be about 98:2 to about 92:8, and a mixture ratio of the conductor to the binder may be about 1:1.5 to about 1:3. In an implementation, one or more of the conductor, the binder, and the solvent may be omitted according to the use and composition of the lithium battery.

The positive electrode 100 may include a current collector 102 and a positive active material layer 104 on the current collector 102.

The current collector 102 may be or may include, e.g., Al, and may have, e.g., a thin film shape, flat shape, a mesh (grid) shape, and a foam (sponge) shape.

The positive active material for forming the positive active material layer 104 may include a suitable positive active material, and may include a compound that is capable of reversible intercalation and deintercalation of lithium ions. For example, the positive active material may include at least one composite oxide of lithium and a metal selected from cobalt, manganese, nickel, and a combination thereof, and the detailed examples thereof include a compound represented by any one of chemical formulae of $Li_aA_{1-b}B_bD_2$ (wherein, $0.90 \leq a \leq 1.8$, and $0 \leq b \leq 0.5$); $Li_aE_{1-b}B_bO_{2-c}D_c$ (wherein, $0.90 \leq a \leq 1.8$, $0 \leq b \leq 0.5$, and $0 \leq c \leq 0.05$); $LiE_{2-b}B_bO_4{}_{-c}D_c$ (wherein, $0 \leq b \leq 0.5$, and $0 \leq c \leq 0.05$); $Li_aNi_{1-b-c}Co_bB_cD_\alpha$ (wherein, $0.90 \leq a \leq 1.8$, $0 \leq b \leq 0.5$, $0 \leq c \leq 0.05$, and $0 \leq \alpha \leq 2$); $Li_aNi_{1-b-c}Co_bB_cO_{2-\alpha}F_\alpha$ (wherein, $0.90 \leq a \leq 1.8$, $0 \leq b \leq 0.5$, $0 \leq c \leq 0.05$, and $0 \leq \alpha \leq 2$); $Li_aNi_{1-b-c}Co_bB_cO_{2-\alpha}F_2$ (wherein, $0.90 \leq a \leq 1.8$, $0 \leq b \leq 0.5$, $0 \leq c \leq 0.05$, and $0 \leq \alpha \leq 2$); $Li_aNi_{1-b-c}Mn_bB_cD_\alpha$ (wherein, $0.90 \leq a \leq 1.8$, $0 \leq b \leq 0.5$, $0 \leq c \leq 0.05$, and $0 \leq \alpha \leq 2$); $Li_aNi_{1-b-c}Mn_bB_cO_{2-\alpha}F_\alpha$ (wherein, $0.90 \leq a \leq 1.8$, $0 \leq b \leq 0.5$, $0 \leq c \leq 0.05$, and $0 \leq \alpha \leq 2$); $Li_aNi_{1-b-c}Mn_bB_cO_{2-\alpha}F_2$ (wherein, $0.90 \leq a \leq 1.8$, $0 \leq b \leq 0.5$, $0 \leq c \leq 0.05$, and $0 \leq \alpha \leq 2$); $Li_aNi_bE_cG_dO_2$ (wherein, $0.90 \leq a \leq 1.8$, $0 \leq b \leq 0.9$, $0 \leq c \leq 0.5$, and $0.001 \leq d \leq 0.1$.); $Li_aNi_bCo_cMn_dGeO_2$ (wherein, $0.90 \leq a \leq 1.8$, $0 \leq b \leq 0.9$, $0 \leq c \leq 0.5$, $0 \leq d \leq 0.5$, and $0.001 \leq e \leq 0.1$.); $Li_aNiG_bO_2$ (wherein, $0.90 \leq a \leq 1.8$, and $0.001 \leq b \leq 0.1$.); $Li_aCoG_bO_2$ (wherein, $0.90 \leq a \leq 1.8$, and $0.001 \leq b \leq 0.1$.); $Li_aMnG_bO_2$ (wherein, $0.90 \leq a \leq 1.8$, and $0.001 \leq b \leq 0.1$.); $Li_aMn_2G_bO_4$ (wherein, $0.90 \leq a \leq 1.8$, and $0.001 \leq b \leq 0.1$.); $QO_2$; $QS_2$; $LiQS_2$; $V_2O_5$; $LiV_2O_5$; $LiIO_2$; $LiNiVO_4$; $Li_{(3-f)}J_2(PO_4)_3$ ($0 \leq f \leq 2$); $Li_{(3-f)}Fe_2(PO_4)_3$ ($0 \leq f \leq 2$) and $LiFePO_4$.

Examples of the positive active material may include $LiMn_2O_4$, $LiNi_2O_4$, $LiCoO_2$, $LiNiO_2$, $LiMnO_2$, $Li_2MnO_3$, $LiFePO_4$, and $LiNi_xCo_yO_2$ ($0 < x \leq 0.15$, $0 < y \leq 0.85$).

In the formulae above, A may be Ni, Co, Mn, or a combination thereof; B may be Al, Ni, Co, Mn, Cr, Fe, Mg, Sr, V, a rare earth element, or a combination thereof; D may be O, F, S, P, or a combination thereof; E may be Co, Mn, or a combination thereof; F may be F, S, P, or a combination thereof; G is Al, Cr, Mn, Fe, Mg, La, Ce, Sr, V, or a combination thereof; Q may be Ti, Mo, Mn, or a combination thereof; I may be Cr, V, Fe, Sc, Y, or a combination thereof; and J may be V, Cr, Mn, Co, Ni, Cu, or a combination thereof.

The compound may have a coating layer thereon, or the compound and the compound having a coating layer thereon may be mixed together. The coating layer may include a coating element compound of an oxide of a coating element, a hydroxide of the coating element, an oxyhydroxide of the coating element, an oxycarbonate of the coating element, or a hydroxycarbonate of the coating element. The compound forming the coating layer may be amorphous or crystalline. The coating element included in the coating layer may include Mg, Al, Co, K, Na, Ca, Si, Ti, V, Sn, Ge, Ga, B, As, Zr, or a combination thereof. A suitable method may be used to form the coating layer, e.g., spray coating or immersion or another method that does not negatively affect properties of the positive electrode by using the element in the compound may be used.

The positive active material layer 104 may also include a binder and a conductor.

The binder may thoroughly bind positive active material particles to each other and may also thoroughly bind the positive active material to the current collector 102. Examples of the binder may include polyvinyl alcohol, carboxymethyl cellulose, hydroxypropyl cellulose, diacetyl cellulose, polyvinylchloride, carboxylated polyvinyl chloride, carboxylated polyvinyl chloride, polyvinyl fluoride, a polymer including ethylene oxide, polyvinylpyrrolidone, polyurethane, polytetrafluoroethylene (PTFE), polyvinylidene fluoride, polyethylene, polypropylene, styrene-butadiene rubber, acrylated styrene-butadiene rubber, epoxy resin, and nylon.

The conductor may be used to provide conductivity to the electrode, and may include a suitable conductive material that does not cause chemical changes to the battery. Examples of the conductor may include natural graphite, artificial graphite, carbon black, acetylene black, Ketjen black, carbon fiber, metal powders and metal fibers of copper, nickel, aluminum, silver, or the like, and one or two different types of the conductive materials, such as polyphenylene derivatives may be mixed to be used as a conductor.

Amounts of the positive active material, the binder, and the conductor may be amounts suitably used in a lithium battery. For example, a weight ratio of the positive active material to a mixture weight of the conductor and the binder may be about 98:2 to about 92:8, and/or a mixture ratio of the conductor and binder may be about 1:1.5 to about 1:3.

If desired, a plasticizer may be further added to the negative active material composition and the positive active material composition to produce holes in electrode plates.

The electrolyte 130 may be the electrolyte described above. Types and amounts of a non-aqueous organic solvent and a lithium salt included in the electrolyte 130 may be as described above and thus, repeated descriptions thereof may be omitted. Also, an additive may be added to the electrolyte 130, if desired. Types and the amounts of the additive may be as described above and thus, repeated descriptions thereof are omitted.

The separator 120 may be a separator suitably used for a lithium battery. The separator may have a low resistance to migration of ions of an electrolyte and an excellent electrolytic solution-retaining capability. For example, the separator may be selected from the group of glass fiber, polyester, Teflon, polyethylene, polypropylene, polytetrafluoroethylene (PTFE), and a combination thereof, each of which may be nonwoven or woven. For example, a separator 120 that may be rolled, such as polyethylene or polypropylene, may be used in a lithium ion battery, and a separator having an excellent electrolytic solution-retaining capability may be used in a lithium ion polymer battery.

For example, the separator may be prepared by the method as described below. A polymer resin, a filler, and a solvent may be mixed to prepare a separator composition. The separator composition may be directly coated and then dried on an electrode to prepare a separator. In an implementation, the separator composition may be cast and then dried on a support, and a separator film peeled off from the support may be laminated on the electrode to prepare a separator.

The polymer resin used for preparing the separator may include a suitable material used as a binder for an electrode plate. For example, vinylidene fluoride/hexafluoropropylene copolymer, polyvinylidene fluoride (PVDF), polyacrylonitrile, polymethyl methacrylate, or a mixture thereof may be used.

The lithium battery 200 may be a lithium battery for solid state drive backup power. The lithium battery for solid state drive backup power may be a lithium ion battery.

A driving temperature range of the lithium battery for solid state drive backup power may be about −10° C. to about 85° C.

Lithium batteries may be, e.g., categorized into cylindrical lithium batteries, rectangular lithium batteries, coin-shaped lithium batteries, and pouch-shaped lithium batteries, according to the shape thereof. The lithium battery according to an embodiment may have a suitable shape.

The lithium battery 200 may include the separator 120 between the positive electrode 100 and the negative electrode 110 to manufacture a battery structure. The battery structure may be laminated into a bi-cell structure and then impregnated into or with an organic electrolyte, and a product obtained therefrom may be housed in a pouch to complete a lithium ion polymer battery.

A plurality of battery structures may be layered to form a battery pack. The battery pack may be used in a device that requires high capacity and high output, depending on the situation. For example, the battery pack may be used in notebook computers, smart phones, or electric vehicles.

The following Examples and Comparative Examples are provided in order to highlight characteristics of one or more embodiments, but it will be understood that the Examples and Comparative Examples are not to be construed as limiting the scope of the embodiments, nor are the Comparative Examples to be construed as being outside the scope of the embodiments. Further, it will be understood that the embodiments are not limited to the particular details described in the Examples and Comparative Examples.

EXAMPLES

Example 1

Preparation of an Electrolyte for a Lithium Battery for Solid State Drive Backup Power A 1.0 M $LiBF_4$ solution in a mixed organic solvent including 45 parts by weight of propylene carbonate, 45 parts by weight of ethylene carbonate, and 10 parts by weight of diethylene carbonate was used as an electrolyte for a lithium battery for solid state drive backup power.

Example 2

Preparation of an Electrolyte for a Lithium Battery for Solid State Drive Backup Power An electrolyte for a lithium battery for solid state drive backup power was prepared in the same manner as in Example 1, except that a 0.8 M $LiBF_4$ solution was prepared instead of 1.0 M $LiBF_4$.

Example 3

Preparation of an Electrolyte for a Lithium Battery for Solid State Drive Backup Power An electrolyte for a lithium battery for solid state drive backup power was prepared in the same manner as in Example 1, except that a 1.2 M $LiBF_4$ solution was prepared instead of 1.0 M $LiBF_4$.

Example 4

Preparation of an Electrolyte for a Lithium Battery for Solid State Drive Backup Power An electrolyte for a lithium battery for solid state drive backup power was prepared in the same manner as in Example 1, except that a mixed organic solvent including 20 parts by weight of propylene carbonate, 70 parts by weight of ethylene carbonate, and 10 parts by weight of diethylene carbonate was used, instead of the mixed organic solvent including 45 parts by weight of propylene carbonate, 45 parts by weight of ethylene carbonate, and 10 parts by weight of diethylene carbonate.

Example 5

Preparation of an Electrolyte for a Lithium Battery for Solid State Drive Backup Power An electrolyte for a lithium battery for solid state drive backup power was prepared in the same manner as in Example 1, except that a mixed organic solvent including 25 parts by weight of propylene carbonate, 65 parts by weight of ethylene carbonate, and 10 parts by weight of diethylene carbonate was used instead of the mixed organic solvent including 45 parts by weight of propylene carbonate, 45 parts by weight of ethylene carbonate, and 10 parts by weight of diethylene carbonate.

Example 6

Preparation of an Electrolyte for a Lithium Battery for Solid State Drive Backup Power An electrolyte for a lithium battery for solid state drive backup power was prepared in the same manner as in Example 1, except that a mixed organic solvent including 30 parts by weight of propylene carbonate, 60 parts by weight of ethylene carbonate, and 10 parts by weight of diethylene carbonate was used instead of the mixed organic solvent including 45 parts by weight of propylene carbonate, 45 parts by weight of ethylene carbonate, and 10 parts by weight of diethylene carbonate.

Comparative Example 1

Preparation of an Electrolyte for a Lithium Battery for Solid State Drive Backup Power A 1.0 M $LiPF_6$ solution in a mixed organic solvent including 45 parts by weight of propylene carbonate, 45 parts by weight of ethylene carbonate, 10 parts by weight of diethylene carbonate was used to prepare an electrolyte for a lithium battery for solid state drive backup power

Comparative Example 2

Preparation of an Electrolyte for a Lithium Battery for Solid State Drive Backup Power An electrolyte for a lithium battery for solid state drive backup power was prepared in the same manner as in Example 1, except that a 0.5 M $LiBF_4$ solution was used instead of 1.0 M $LiBF_4$.

Comparative Example 3

Preparation of an Electrolyte for a Lithium Battery for Solid State Drive Backup Power An electrolyte for a lithium battery for solid state drive backup power was prepared in the same manner as in Example 1, except that a 1.4 M $LiBF_4$ solution was used instead of 1.0 M $LiBF_4$.

Comparative Example 4

Preparation of an Electrolyte for a Lithium Battery for Solid State Drive Backup Power An electrolyte for a lithium battery for solid state drive backup power was prepared in the same manner as in Example 1, except that a mixed organic solvent including 10 parts by weight of propylene carbonate, 80 parts by weight of ethylene carbonate, and 10 parts by weight of diethylene carbonate was used instead of the mixed organic solvent including 45 parts by weight of propylene carbonate, 45 parts by weight of ethylene carbonate, and 10 parts by weight of diethylene carbonate.

Example 7

Preparation of a Lithium Battery for Solid State Drive Backup Power $LiCoO_2$ powder and a carbon conductor (Denka black) as positive active materials were mixed, and a pyrrolidone solution including a polyvinylidene fluoride (PVDF) binder was added thereto to prepare a slurry including positive active material:carbon conductor:binder at a weight ratio of 90:4:6.

The positive electrode slurry was coated on an aluminum foil having a thickness of 15 μm by using a bar coating method to a thickness of about 20 μm to about 30 μm, dried, and then dried again at a temperature of 110° C. under a vacuum atmosphere to manufacture a positive electrode plate. The positive electrode plate was roll pressed to manufacture a positive electrode having a sheet form.

A pyrrolidone solution including carboxymethyl cellulose (CMC) and styrene-butadiene rubber (SBR) as binders were added to soft carbon, a negative active material, to prepare a negative electrode slurry, such that a weight ratio of negative active material:binder was 97:3.

The negative electrode slurry was coated on a copper foil having a thickness of 10 μm by using a bar coating method to a thickness of about 40 μm to about 50 μm, dried, and then dried again at a temperature of 110° C. under a vacuum atmosphere to manufacture a negative electrode plate. The negative electrode plate was roll pressed to manufacture a negative electrode having a sheet form.

A film separator formed of polyethylene/polypropylene material was disposed between the positive electrode and the negative electrode to manufacture a pouch-type cell, and then the electrolyte for a lithium battery for solid state drive backup power manufactured in Example 1 was injected thereto to manufacture a pouch-type lithium battery for solid state drive backup power.

Examples 8 to 12

Manufacturing a Lithium Battery for Solid State Drive Backup Power

A pouch-type lithium battery for solid state drive backup power was manufactured in the same manner as in Example 7, except that the electrolytes for a lithium battery for solid state drive backup power prepared in Examples 2 to 6 were used, instead of the electrolyte for a lithium battery for solid state drive backup power prepared in Example 1.

Comparative Examples 5 to 8

Manufacturing a Lithium Battery for Solid State Drive Backup Power

A pouch-type lithium battery for solid state drive backup power was manufactured in the same manner as in Example 7, except that the electrolytes for a lithium battery for solid state drive backup power prepared in Comparative Examples 1 to 4 were used, instead of the electrolyte for a lithium battery for solid state drive backup power prepared in Example 1.

Evaluation Example 1

Evaluation of Direct Current Internal Resistance (DC-IR)

Figure 2:
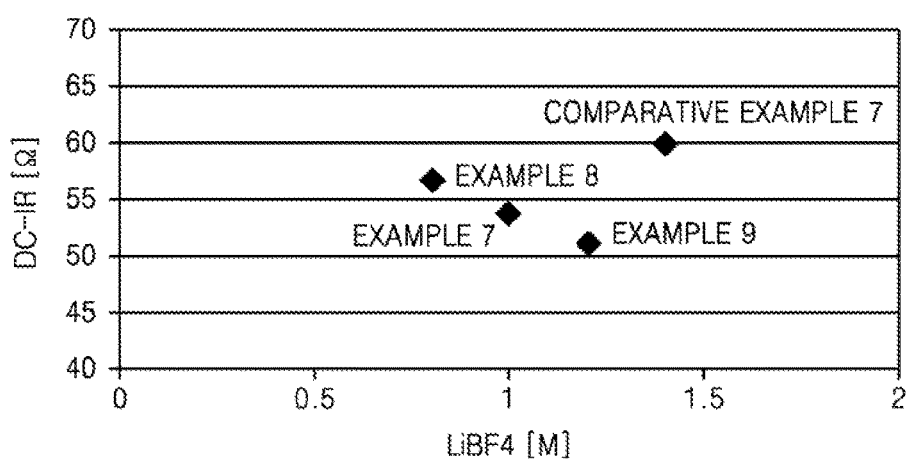
FIG. 2 illustrates a graph showing direct current internal resistance (DC-IR) evaluation results of the lithium batteries for solid state drive backup power manufactured in Examples 7-9 and Comparative Example 7 at a temperature of 25° C.
Figure 3:
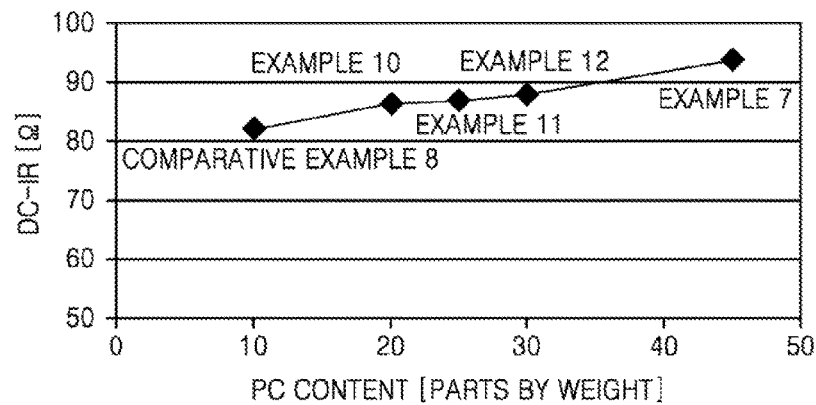
FIG. 3 illustrates a graph showing DC-IR evaluation results of the lithium batteries for solid state drive backup power manufactured in Examples 7 and 10-12 and Comparative Example 8 at a temperature of 25° C.

The lithium batteries for solid state drive backup power manufactured in Examples 7 to 9 and Comparative Example 7 were evaluated for DC-IR at a temperature of 25° C., and the lithium batteries for solid state drive backup power manufactured in Examples 7 and 10 to 12 and Comparative Example 8 were evaluated for DC-IR at a temperature of 25° C. The results obtained therefrom are shown in FIGS. 2 and 3, respectively.

The DC-IR evaluation was measured through the charge and discharge experiment described below.

A formation charge and discharge process was repeated three times with respect to the lithium batteries. During the first formation process, the lithium batteries were charged by using a constant current and constant voltage (CCCV) method at 0.2 C (cut-off at 0.05 C) until 4.2 V was reached. Then, the lithium batteries were constant current discharged at 0.2 C, until 2 V was reached.

The lithium batteries that passed through the formation process were charged by using a CCCV method at 1 C (cut-off at 0.05C), until 4.2 V was reached and then discharged at 1 C until 2 V was reached. The charge and discharge conditions were standard charge and discharge conditions and the discharge capacity during this process was the standard capacity.

Thereafter, the lithium batteries were charged in the manner described above at 1 C until 4.2 V was reached and then discharged at 4.5 A (30 C) until 2 V was reached. At this time, the initial voltage drop (ΔV) was measured to calculate a DC-IR value from Equation 1.

<Equation 1>

$$\Delta V = IR$$

Referring to FIG. 2, the lithium batteries for solid state drive backup power manufactured in Examples 7 to 9 showed a gradual reduction in DC-IR from about 56 ohm (Ω) to about 51 ohm (Ω), and the lithium batteries for solid state drive backup power manufactured in Comparative Example 7 showed a sharp increase in DC-IR to about 60 ohm (Ω). For example, the lithium batteries for solid state drive backup power manufactured in Examples 7 to 9 showed a gradual reduction in DC-IR, as a molar concentration of $LiBF_4$ in the electrolyte of the lithium batteries increased from 0.8 M to 1.2 M. When the molar concentration of $LiBF_4$ in the electrolyte of the lithium battery for solid state drive backup power of Comparative Example 7 exceeded 1.2 M, e.g., 1.4 M, it may be seen that the DC-IR of the lithium batteries sharply increased.

Referring to FIG. 3, it may be seen that the lithium batteries for solid state drive backup power manufactured in Comparative Example 8, Examples 10 to 12 and 7 sequentially showed a gradual increase in DC-IR from about 81 ohm (Ω) to about 93 ohm (Ω). For example, it may be seen that as the amount of propylene carbonate in the electrolyte of the lithium batteries for solid state drive backup power manufactured in Comparative Example 8 and Examples 10 to 12 and 7 gradually increased, the DC-IR of the lithium batteries gradually increased.

Evaluation Example 2

Evaluation of High Temperature Stability

The lithium batteries for solid state drive backup power manufactured in
Examples 7 and 10 to 12 and Comparative Example 8 were charged and discharged through a charge and discharge experiment performed in the same manner as in Evaluation Example 1. Then, the lithium batteries were maintained in an isothermal chamber at a temperature of 85° C. for about 350 hours, and then a thickness increase rate (%) of the lithium batteries was measured. The results obtained therefrom are shown in FIG. 4.

Figure 4:
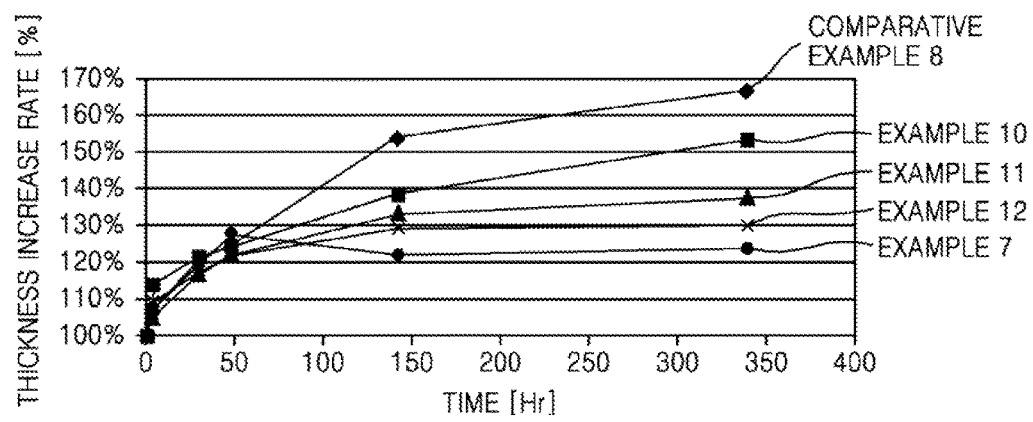
FIG. 4 illustrates a graph showing measurement results of thickness increase rates (%) of the lithium batteries for solid state drive backup power manufactured in Examples 7 and 10-12 and Comparative Example 8 after maintaining the lithium batteries in an isothermal chamber at a temperature of 85° C. for about 350 hours.

Referring to FIG. 4, the lithium batteries for solid state drive backup power manufactured in Comparative Example 8 and Examples 10 to 12 and 7 sequentially showed a gradual reduction in a thickness increase rate from about 167% to about 123%. For example, the lithium batteries for solid state drive backup power manufactured in Examples 7 and 10 to 12 showed a gradual decrease in a thickness increase rate of the lithium batteries from about 15% up to about 45%, compared with the thickness increase rate of Comparative Example 8, as the amount of propylene carbonate in the electrolyte included in the lithium batteries gradually increased.

As a result, it may be seen that the lithium batteries for solid state drive backup power manufactured in Examples 7 and 10 to 12, in which the amount of propylene carbonate in the electrolyte was 20 parts by weight or greater, had a relatively low thickness increase rate and thus, had better lithium battery characteristics at a high temperature of about 85° C., compared with the lithium battery for solid state drive backup power of Comparative Example 8, in which the amount of propylene carbonate in the electrolyte was less than 20 parts by weight.

Evaluation Example 3

Evaluation of High Temperature Pulse Characteristics

The lithium batteries for solid state drive backup power manufactured in Example 7 and Comparative Examples 5 and 6 were subjected to a formation charge and discharge for three times at room (e.g., ambient) temperature. During the first formation process, the lithium batteries were charged by using a CCCV method at 0.2 C (cut-off at 0.05 C), until 4.2 V was reached. Then, the lithium batteries were constant current discharged at 0.2 C until 2 V was reached.

The lithium batteries subject to the formation process described above were charged at 1 C by using a CCCV method (cut-off at 0.05 C), until 4.2 V was reached, and then discharged at 1 C, until 2 V was reached. The charge and discharge conditions during this process were standard charge and discharge conditions, and a discharge capacity during this process was a standard capacity.

Figure 5:
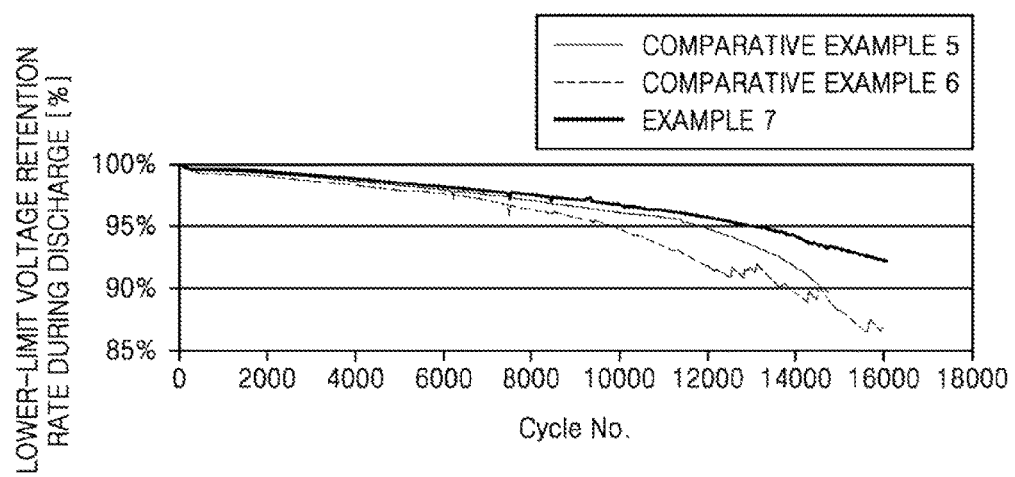
FIG. 5 illustrates a graph showing measurement results of lower-limit voltage retention rate of the lithium batteries for solid state drive backup power manufactured in Example 7 and Comparative Examples 5 and 6 after discharging the batteries in an isothermal chamber at a temperature of 85° C. at 3 A (about 20 C) for 1 second each.

Then, the lithium batteries were constant current charged in an isothermal chamber at a temperature of 85° C. at 1 A until 4 V was reached and then continuously discharged at 4.5 A for 0.5 seconds and at 3 A for 2 seconds. A lower-limit voltage retention rate during this process was measured. The lower-limit voltage retention rate was measured by repeating a charge and discharge cycle for 16,000 times and a lower-limit voltage retention rate (%) during a discharge was measured for each cycle. The results are shown in FIG. 5.

The lower-limit voltage retention rate (%) during a discharge in each cycle was calculated from Equation 2 below.

<Equation 2>

Lower-limit voltage retention rate (%) during a discharge in each cycle=[(lower-limit voltage during a discharge in each cycle/a discharge voltage in one cycle)×100]

Referring to FIG. 5, the lower-limit voltage retention rate (%) during a discharge of the lithium battery for solid state drive backup power manufactured in Example 7, subjected to 16,000 cycles, was about 92%, and the lower-limit voltage retention rates (%) during a discharge of the lithium batteries for solid state drive backup power manufactured in Comparative Examples 5 and 6, subjected to 16,000 cycles, were about 86% and about 87%, respectively. For example, the lower-limit voltage retention rate (%) during a discharge of the lithium battery for solid state drive backup power manufactured in Example 7, subjected to 16,000 cycles, was higher than the lower-limit voltage retention rate (%) of the lithium batteries during a discharge for solid state drive backup power manufactured in Comparative Examples 5 and 6, subjected to 16,000 cycles.

From these results, it may be seen that the lithium battery for solid state drive backup power including the electrolyte that included $LiBF_4$ as a lithium salt, as manufactured in Example 7, had better battery characteristics, e.g., due to inhibition of a side reaction with the positive electrode.

By way of summation and review, an additional feature, e.g., a supercapacitor or a battery, may be used as a backup power supply to supplement the NAND flash memory and the DRAM memory.

One of the additional features may include a lithium battery, e.g., a lithium ion battery (LIB), which may have high energy density and ease of design. The LIB may include a positive electrode including a positive active material, a negative electrode including a negative active material, and an electrolyte between the positive electrode and the negative electrode.

When a lithium battery including some electrolytes is maintained at a high temperature, e.g., of about 60° C. or greater, the lithium battery may swell and it may be more difficult to stably charge and discharge a lithium battery for solid state drive backup power, which may have a driving temperature range of about −10° C. to about 85° C.

An electrolyte according to an embodiment may enable a lithium battery to be stable even when the lithium battery for solid state drive backup power is maintained at a high temperature, e.g., of about 60° C. or greater, and may enable a lithium battery to be stably charged and discharged in a driving temperature range of the lithium battery described above and more particularly, at a high temperature.

The embodiments may provide an electrolyte for a lithium battery for solid state drive backup power in which the lithium battery is thermally stable at a high temperature and that may be stably charged and discharged during a drive.

As described above, according to the one or more of the above embodiments, an electrolyte for a lithium battery for solid state drive backup power may help reduce or inhibit a side reaction with a positive electrode at a high temperature. Thus, the lithium battery including the electrolyte may be thermally stable even when maintained at a high temperature, and may be stably charged and discharged when driven at a high temperature.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. An electrolyte for a lithium battery for solid state drive backup power, the electrolyte comprising:
    propylene carbonate;
    ethylene carbonate;
    diethyl carbonate; and
    $LiBF_4$, wherein:
    the propylene carbonate is present in an amount of about 20 parts by weight to about 50 parts by weight, the ethylene carbonate is present in an amount of about 40 parts by weight to about 90 parts by weight, and the diethyl carbonate is present in an amount of about 1 part by weight to 10 parts by weight, based on 100 parts by weight of the combined propylene carbonate, ethylene carbonate, and diethylene carbonate, and
    the electrolyte contains the $LiBF_4$ in a molar concentration of about 0.8 M to about 1.2 M.

2. The electrolyte for a lithium battery for solid state drive backup power as claimed in claim 1, wherein the electrolyte further includes at least one of fluoroethylene carbonate, butylene carbonate, dimethyl carbonate, methylethyl carbonate, methylpropyl carbonate, ethylpropyl carbonate, methyl isopropyl carbonate, dipropyl carbonate, dibutyl carbonate, benzonitrile, acetonitrile, tetrahydrofuran, 2-methyl tetrahydrofuran, γ-butyrolactone, dioxolane, 4-methyl dioxolane, N, N-dimethylformamide, dimethylacetamide, dimethylsulfoxide, dioxane, 1,2-dimethoxyethane, sulfolane, dichloroethane, chlorobenzene, nitrobenzene, diethylene glycol, or dimethyl ether.

3. The electrolyte for a lithium battery for solid state drive backup power as claimed in claim 1, further comprising an additive including at least one of 1,3-propane sultone, succinic anhydride, ethenyl sulfonyl benzene, fluorobenzene, chlorobenzene, bromobenzene, iodobenzene, biphenyl, cyclohexyl benzene, or vinylene carbonate.

4. The electrolyte for a lithium battery for solid state drive backup power as claimed in claim 3, wherein the additive is included in the electrolyte in an amount of about 0.1 wt % to about 20 wt %, based on a total weight of the electrolyte.

5. A lithium battery for solid state drive backup power, the lithium battery comprising:
    a positive electrode including a positive active material capable of intercalation and deintercalation of lithium ions;
    a negative electrode including a negative active material capable of intercalation and deintercalation of lithium ions; and
    the electrolyte as claimed in claim 1.

6. The lithium battery for solid state drive backup power as claimed in claim 5, wherein the negative active material includes soft carbon.

7. The lithium battery for solid state drive backup power as claimed in claim 5, wherein the lithium battery for solid state drive backup power is a lithium ion battery.

8. The lithium battery for solid state drive backup power as claimed in claim 5, wherein a driving temperature range of the lithium battery for solid state drive backup power is about −10° C. to about 85° C.

9. The lithium battery for solid state drive backup power as claimed in claim 5, further comprising a separator between the positive electrode and the negative electrode.

10. The lithium battery for solid state drive backup power as claimed in claim 5, wherein one of the positive electrode or the negative electrode includes a current collector, the current collector including aluminum.

11. A solid state drive, comprising:
    a controller;
    a memory that stores data;
    a cache memory; and
    a lithium ion battery, the lithium ion battery being configured as backup power for the solid state drive, the lithium ion battery including:
    a positive electrode including a positive active material capable of intercalation and deintercalation of lithium ions;
    a negative electrode including a negative active material capable of intercalation and deintercalation of lithium ions; and
    an electrolyte that includes propylene carbonate, ethylene carbonate, diethyl carbonate, and $LiBF_4$, wherein:
    the propylene carbonate is present in an amount of about 20 parts by weight to about 50 parts by weight, the ethylene carbonate is present in an amount of about 40 parts by weight to about 90 parts by weight, and the diethyl carbonate is present in an amount of about 1 part by weight to 10 parts by weight, based on 100 parts by weight of the combined propylene carbonate, ethylene carbonate, and diethylene carbonate, and
    the electrolyte contains the $LiBF_4$ in a molar concentration of about 0.8 M to about 1.2 M.

* * * * *